United States Patent
Ahlström et al.

[19]

[11] Patent Number: 6,059,184
[45] Date of Patent: May 9, 2000

[54] METHOD AND DEVICE FOR TURN NUMBER SYSTEMS

[75] Inventors: Bengt Ahlström, Österskär; Lars Jarder, Täby, both of Sweden

[73] Assignee: Abbela Eektronick AB, Sollentuna, Sweden

[21] Appl. No.: 08/983,350

[22] PCT Filed: Jul. 9, 1996

[86] PCT No.: PCT/SE96/00931

§ 371 Date: Feb. 11, 1998

§ 102(e) Date: Feb. 11, 1998

[87] PCT Pub. No.: WO97/03418

PCT Pub. Date: Jan. 30, 1997

[30] Foreign Application Priority Data

Jul. 10, 1995 [SE] Sweden ................................. 9502560

[51] Int. Cl.[7] .................................................... G06F 17/00
[52] U.S. Cl. .......................... 235/375; 235/380; 235/382; 705/5; 705/8
[58] Field of Search ..................... 235/375, 379, 235/380, 382, 385, 384, 487, 492, 493; 902/4, 5, 26, 27

[56] References Cited

U.S. PATENT DOCUMENTS

| | | | |
|---|---|---|---|
| 3,893,097 | 7/1975 | Lach et al. | 340/286.02 |
| 4,298,793 | 11/1981 | Melis et al. | 235/487 |
| 4,675,647 | 6/1987 | Salin et al. | 340/286.06 |
| 4,757,529 | 7/1988 | Glapa et al. | 379/244 |
| 5,006,983 | 4/1991 | Wayne et al. | 705/8 |
| 5,175,417 | 12/1992 | Fujishima et al. | 235/380 |
| 5,429,361 | 7/1995 | Raven et al. | 273/138 A |
| 5,502,806 | 3/1996 | Mahoney et al. | 235/382 X |
| 5,657,389 | 8/1997 | Houvener | 380/23 |
| 5,866,890 | 2/1999 | Neuner | 235/381 |

FOREIGN PATENT DOCUMENTS

WO 9009002  8/1990  WIPO.

*Primary Examiner*—Donald Hajec
*Assistant Examiner*—Jared J. Fureman
*Attorney, Agent, or Firm*—Nixon & Vanderhye P. C.

[57] ABSTRACT

A method for a queue number system for serving customers at least at one service position is provided in which customers obtain a queue number, select a service type using a selector unit, and are thereby given a queue number from a particular queue number series for the type of service selected. The dispensed queue numbers are registered and the customers are summoned by an information unit when they are to be served, preferably in queue number order. A customer whom one wishes to identify and/or give priority to within the queue number system is provided with an individual code which is supplied to a central unit included in the queue number system when the customer is allotted a queue number so that a customer is, to the desired extent, identified and/or given priority. That customer's specific information, including the code, is stored in a customer data unit and is transferred to the desired extent to the service position to which the customer is directed.

20 Claims, 1 Drawing Sheet

METHOD AND DEVICE FOR TURN NUMBER SYSTEMS

CROSS REFERENCE TO RELATED APPLICATION

This is a U.S. national phase of PCT/SE96/00931.

BACKGROUND AND SUMMARY OF THE INVENTION

The present invention relates to a method for a queue number system for serving customers at least at one service position, by which method customers, to obtain a queue number, select a service type by means of a selection unit and are thereby given a queue number from a particular queue number series for the service type, the dispensed queue numbers being registered and the customers being summoned via an information unit to be served, preferably in queue number order.

The invention also relates to a device for a queue number system.

Queue number systems of substantially this type are previously known. Each queue number series corresponds to a particular queue, and thus there can be a number of queues, usually corresponding to the number of types of service.

The present invention relates to a method and a device for a queue number system, by means of which customers can be given priority both in the queue and as regards information and service, and this can also provide security advantages.

According to one aspect of the present invention a method for a queue number system for serving customers at at least one service position is provided, by which customers obtain a queue number, select a service type (using a selection unit), and are thereby given a queue number from a particular queue number series for the service type. The dispensed queue numbers are registered and the consumer is summoned by an information unit to be served, preferably in queue number order. A customer, whom one wishes to identify and/or give priority to within the queue number system, is provided with an individual code which is supplied to a central unit in the queue number system when the customer is given a queue number, whereupon the customer, to the desired extent, is identified and/or given priority as regards queue numbers, and individual information for the customer including the code is stored in a customer data unit and is transferred to the desired extent to the service position to which the customer is directed.

According to another aspect of the present invention a device for a queue number system for serving customers at least at one service position is provided. The device includes a selector unit by means of which the customers, for dispensing of queue numbers, can select at least one type of service and then be given a queue number from a particular queue number series for that type of service and there being means for registering dispensed queue numbers and for summoning customers via an information unit to be served. In the device there is a central unit which is adapted to be supplied with an individual code when a customer whom one desires to identify and/or give priority to within the queue number system, is allotted a queue number and, to the desired extent, identify the customer and/or give priority to the customer as regards queue numbers. There is a customer data unit arranged for storage of individual information for a customer as well as said code, and there is means for transferring said individual information to the desired extent to the service position to which the customer is directed.

DETAILED DESCRIPTION OF THE DRAWINGS

Figure 1:
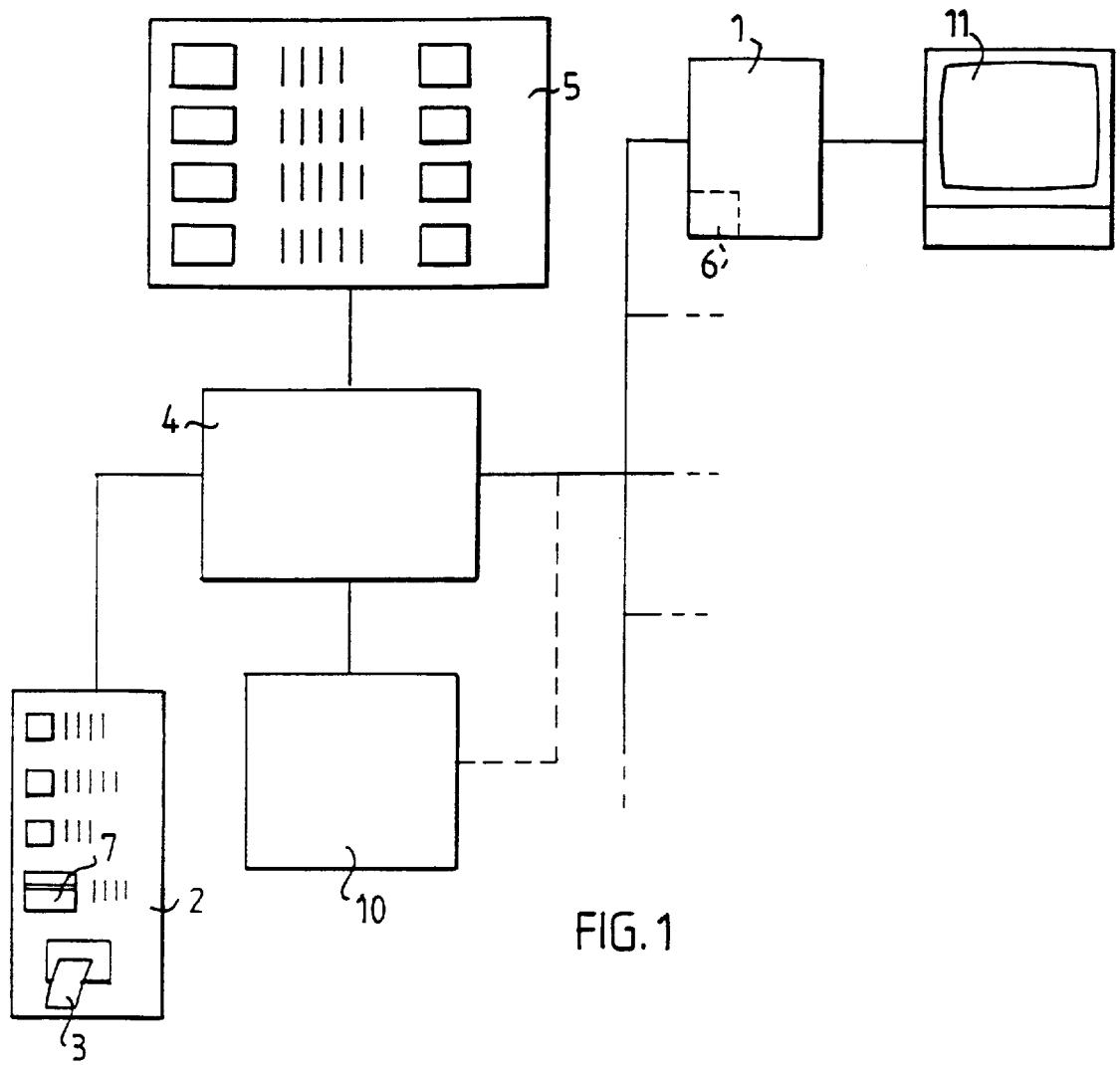
FIG. 1 shows a schematic diagram of a first embodiment of a queue number system according to the invention.
Figure 2:
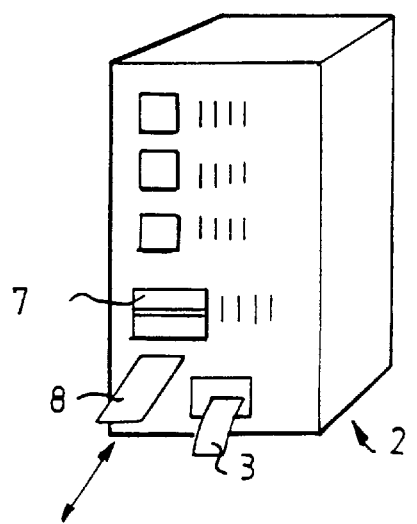
FIG. 2 shows schematically a first embodiment of a queue number unit, the selection unit, according to the invention.

The numeral 1 in FIG. 1 designates the service positions, e.g. a teller's windows intended for serving customers. The numeral 2 designates a selection unit, by means of which the customers can select at least one type of service and be allotted a queue number, e.g. in the form of a queue ticket 3, from a queue number series for a particular type of service. The numeral 4 designates a central unit, preferably in the form of a computer, arranged for registering the allotted queue number and for directing customers, via an information unit 5, to service at free service positions. preferably in queue number order. In accordance with a preferred embodiment, each service position is provided with an advancing unit 6 connected to the central unit in order to activate the advance to the next queue number when the service position becomes free.

According to the invention, the queue number system comprises devices for identifying and/or giving priority to customers, there being means 7, such as a card reader 7, having a card reader unit therein to supply the central unit 4, for example an individual code when a customer, whom one wants to identify and/or give a priority to within the scope of the queue number system, is supplied a queue number, whereby the central unit or the like is arranged to give priority to the code owner to the desired extent. This can be done in a number of different manners. According to one embodiment, the priority customers have their own number series.

According to a preferred embodiment, said code is intended to be carried by an automatically readable information carrier 8, e.g. a magnetic card or a so-called smart card. The selection unit comprises here a reader unit, such as the card reader unit in card reader 7, via which said code is intended to be supplied to the central unit, which in this case is disposed to determine the identification and/or priority status of the customer on the basis of the code. In this case the choice of the customer is intended to be made by use of the information carrier.

Also according to the invention there is a customer data unit 10 designed for storage of individual customer information, including said code. The customer data unit 10 is coupled to the queue number system, so that information from the customer data unit can be transferred to the desired extent to the service position, to which the customer is referred when it is his turn. For this purpose, the service positions are provided with a computer terminal 11.

According to one embodiment, the customer data unit is the ordinary customer computer system of a bank or the like, to which the queue number system is connected. The individual information comprises in this case, for example, the customer's personal data, accounts, balance etc. as well as said code and priority status. According to one embodiment, the individual information comprises a picture of the customer and/or the customer's signature so that a more or less comprehensive identity check can be made at the service position, to which the customer has been referred.

The method, as well as the functioning of the device according to the invention, should be evident from the above discussion. The desired customers can use their individual codes to be identified and/or given priority status, each code being supplied to the central unit for example, e.g. via the selection unit. From the customer data unit, the central unit receives the code corresponding to the status and thereafter places the customer in the proper queue, e.g. a special queue. When it is the customer's turn, the central unit selects the service position, and information concerning the service position is transferred to the customer data unit. The customer's individual information is transferred to the computer terminal of the service position and the information is shown on the screen at the service position or is printed on a printer or the like. In appropriate cases, a picture of the customer and/or the customer's signature is shown for identity check.

As should be evident from the above, the invention provides substantial advantages over the prior art. It is thus possible to identify and/or give priority to a customer at the same time as information concerning a priority customer can be automatically transferred to the computer terminal at the correct service position. By transferring a picture and/or the customer's signature, security advantages are achieved since pictures stored in the computer are particularly difficult to fake. The advantages are achieved by using in most cases existing stored information, which is used in combination with the queue number system. When the customer arrives at the service position in question, the desired information concerning the customer is already there.

The invention has been described above in connection with examples. Other embodiments are of course conceivable as well as minor changes and supplements without deviating from the essential concept of the invention.

Thus it is possible that said code can indicate different levels of priority status as regards queue numbers. It is thus possible that a customer will not be given priority as regards queue number but that the individual information will be transferred to the service position to which the customer is referred. Said code can of course also be supplied by means of a set of buttons or the like.

Furthermore, the queue number system can be of the type where the service positions provide several types of service, and where in practice only one type of service can be selected, i.e. there is only one queue number series.

The service positions can be one or more per type of service. A certain service position can, as was mentioned above, take care of one or more types of service, one or more selections, where the selection of service type can occur with a manual switch at the service position or automatically, controlled by the central unit for example. The advancing of queue numbers can also be done automatically, i.e. without any special advancing unit, for example by means of the central unit, the customer data unit or the customer computer system.

The invention is thus not limited to the above described embodiments but can be varied within its scope defined by the accompanying patent claims.

What is claimed is:

1. A method of operating a queue number system for serving customers at at least one service position, using a queue number selection unit, a central unit, a customer data unit, an information unit, and a customer data retrieval unit at the at least one service position, said method comprising the steps of automatically:

(a) using the queue number selection unit, assigning queue numbers to customers to be served;
    (b) registering the queue numbers in the central unit;
    (c) using the information unit, generally summoning customers to the at least one service position by consecutive queue number assigned by the queue number selection unit;
    (d) for a customer intended to be given priority in being summoned to the at least one service position, initially identifying the customer as a priority customer;
    (e) using the central unit and the information unit, summoning the priority customer identified in step (d) to the at least one service position out of the general summoning sequence of step (c); and
    (f) transferring information about the priority customer from the customer data unit to the customer data retrieval unit at the service position to which the priority customer is summoned.

2. A method as recited in claim 1 wherein step (d) is practiced by the priority customer moving a portable readable information carrier into operative association with the queue number selection unit, and the queue number selection unit reading information on the portable readable information carrier and supplying that information to the central unit.

3. A method as recited in claim 2 wherein step (f) is practiced by transferring individualized identification information about the priority customer, so that the priority customer can be identified at the service position to which the priority customer is summoned.

4. A method as recited in claim 3 wherein step (f) is further practiced by transferring at least one of a picture of the priority customer and the signature of the priority customer.

5. A method as recited in claim 3 wherein the queue numbering system is connected to a computer system of a bank, the customer data unit containing account and related information about customers; and wherein at least one of steps (c) and (e) is practiced to transfer account and related information about a customer to the service position to which a customer is summoned.

6. A method as recited in claim 3 wherein the queue numbering system is connected to a computer system of a bank, the customer data unit containing account and related information about priority customers; and wherein step (e) is practiced to transfer account and related information about a priority customer to the service position to which a customer is summoned when the priority customer is summoned to the service position.

7. A method as recited in claim 1 wherein step (f) is practiced by transferring individualized identification information about the priority customer, so that the priority customer can be identified at the service position to which the priority customer is summoned.

8. A method as recited in claim 7 wherein step (f) is further practiced by transferring at least one of a picture of the priority customer and the signature of the priority customer.

9. A method as recited in claim 7 wherein the queue numbering system is connected to a computer system of a bank, the customer data unit containing account and related information about customers; and wherein at least one of steps (c) and (e) is practiced to transfer account and related information about a customer to the service position to which a customer is summoned.

10. A method as recited in claim 7 wherein the queue numbering system is connected to a computer system of a bank, the customer data unit containing account and related information about priority customers; and wherein step (e) is practiced to transfer account and related information about a priority customer to the service position to which a customer is summoned when the priority customer is summoned to the service position.

11. A method as recited in claim 1 wherein the queue numbering system is connected to a computer system of a bank, the customer data unit containing account and related information about priority customers; and wherein step (e) is practiced to transfer account and related information about a priority customer to the service position to which a customer is summoned when the priority customer is summoned to the service position.

12. A method as recited in claim 1 wherein step (a) is practiced so that the queue number selection unit issues a queue ticket to a customer activating the queue number selection unit.

13. A method as recited in claim 1 wherein step (f) is practiced automatically in response to the summoning of step (e).

14. A method as recited in claim 13 wherein step (d) is practiced by the priority customer moving a portable readable information carrier into operative association with the selection unit, and the selection unit reading information on the portable readable information carrier and supplying that information to the central unit.

15. A device for operating a queue number system for serving customers at at least one service position, comprising:

a queue number selection unit which assigns queue numbers to customers to be served;

a central unit which registers the queue numbers;

a customer data unit containing information about customers;

an information unit for generally summoning customers to the at least one service position by consecutive queue number assigned by the queue number selection unit;

a customer data retrieval unit at the at least one service position;

for a customer intended to be given priority in being summoned to the at least one service position, means for initially identifying the customer as a priority customer;

the central unit, the customer data unit, the means for initially identifying a customer as a priority customer, and the information unit interconnected to provide for summoning a priority customer, identified by the means for initially identifying the customer as a priority customer, to the at least one service position out of the general summoning sequence provided by the information unit; and the customer data unit and the customer data retrieval unit interconnected to effect transfer of information about the priority customer from the customer data unit to the customer data retrieval unit at the service position to which the priority customer is summoned.

16. A device as recited in claim 15 wherein the customer data retrieval unit comprises a computer terminal connected to a bank computer system.

17. A device as recited in claim 16 wherein the customer data unit contains picture or signature data about the priority customer, and wherein the customer data unit and the customer data retrieval unit are interconnected to effect transfer of picture or signature data about the priority customer from the customer data unit to the customer data retrieval unit at the service position to which the priority customer is summoned.

18. A device as recited in claim 15 wherein the means for initially identifying the customer as a priority customer comprises a portable individual information carrier reader associated with said queue number selection unit, and connected to said central unit.

19. A device as recited in claim 18 wherein said selection unit issues a queue ticket in response to activation thereof.

20. A method of serving bank customers at at least one service position, using a selection unit, a central unit, a customer data unit, an information unit, and a customer data retrieval unit at the at least one service position, said method comprising the steps of:

(a) allowing a priority bank customer to move a portable readable information carrier into operative association with the selection unit to identify the customer as a priority customer;

(b) reading information on the portable readable information carrier with the selection unit and supplying that information to the central unit;

(c) summoning the priority bank customer identified in step (a) to the at least one service position using the central unit and the information unit; and (d) transferring individualized identification information about the priority bank customer, including at least one of a picture of the priority customer and the signature of the priority customer, so that the priority customer can be identified at the service position, as well as account information, from the customer data unit to the customer data retrieval unit at the service position to which the priority bank customer is summoned.

* * * * *